H. J. CASE.
BUNDLE CARRIER FOR GRAIN BINDERS.
APPLICATION FILED MAY 11, 1916.

1,272,007.

Patented July 9, 1918.
7 SHEETS—SHEET 1.

Fig. 1.

Attest:

Inventor:
H. J. Case
by
Rogers, Kennedy & Campbell Attys

H. J. CASE.
BUNDLE CARRIER FOR GRAIN BINDERS.
APPLICATION FILED MAY 11, 1916.

1,272,007.

Patented July 9, 1918.
7 SHEETS—SHEET 3.

H. J. CASE.
BUNDLE CARRIER FOR GRAIN BINDERS.
APPLICATION FILED MAY 11, 1916.

1,272,007.

Patented July 9, 1918.
7 SHEETS—SHEET 4.

Attest:

Inventor:
H. J. Case
by
Rogers, Kennedy & Campbell Attys

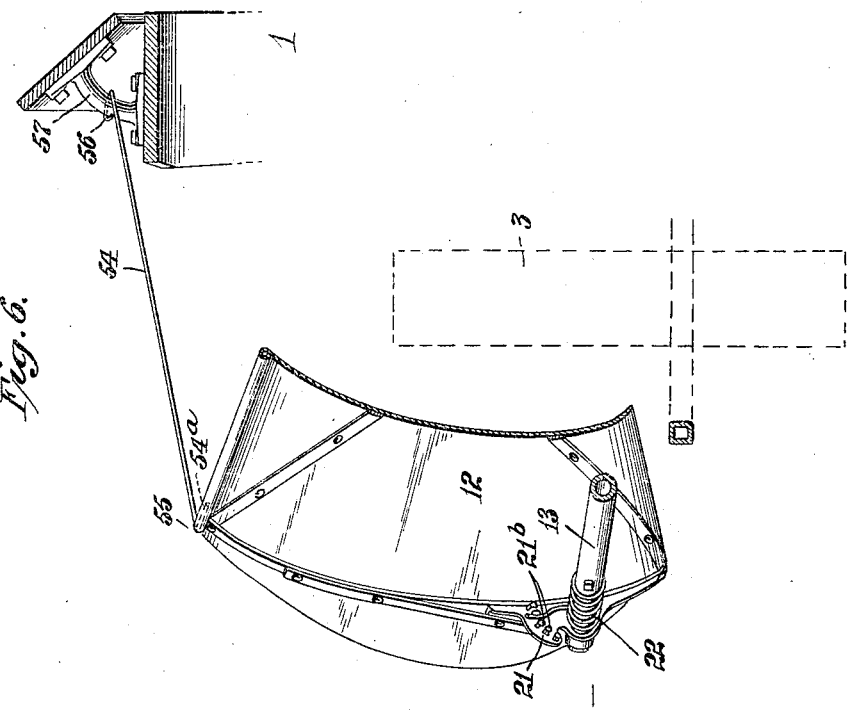
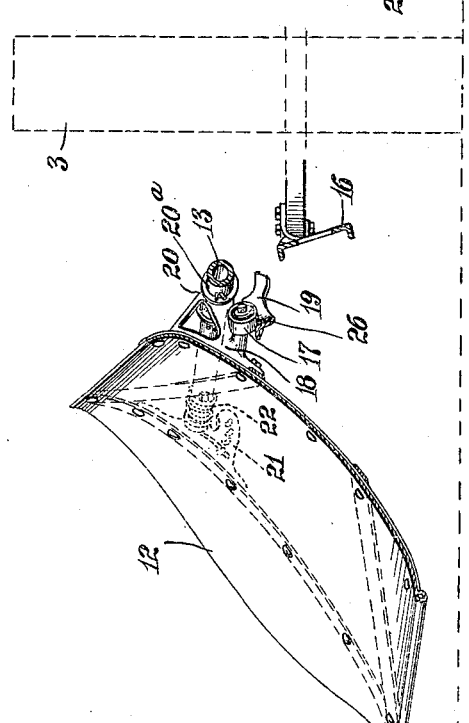

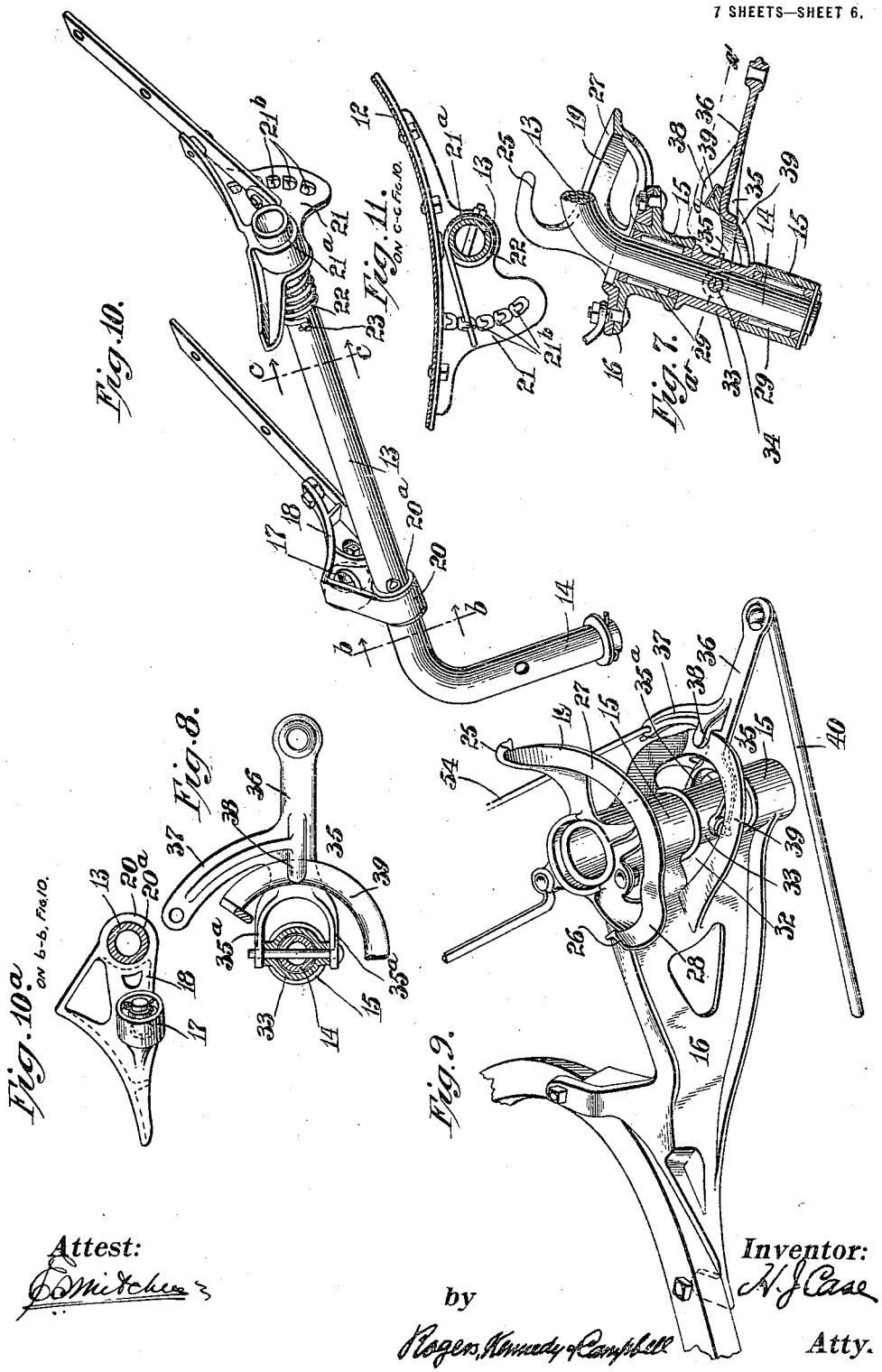
H. J. CASE.
BUNDLE CARRIER FOR GRAIN BINDERS.
APPLICATION FILED MAY 11, 1916.
1,272,007.
Patented July 9, 1918.
7 SHEETS—SHEET 6.

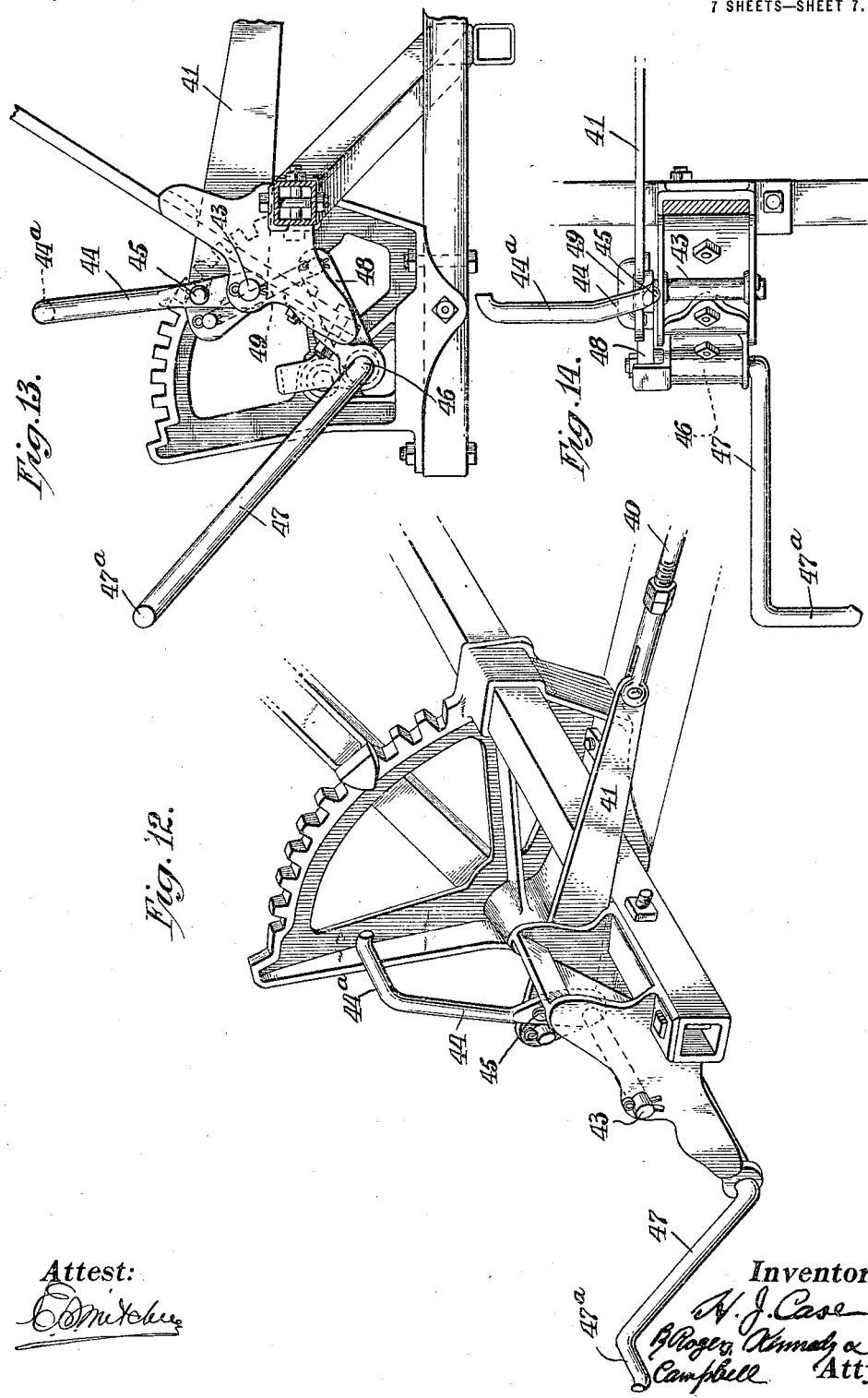

UNITED STATES PATENT OFFICE.

HENRY J. CASE, OF POUGHKEEPSIE, NEW YORK, ASSIGNOR TO MOLINE PLOW COMPANY, A CORPORATION OF ILLINOIS.

BUNDLE-CARRIER FOR GRAIN-BINDERS.

1,272,007.    Specification of Letters Patent.    Patented July 9, 1918.

Application filed May 11, 1916. Serial No. 96,772.

*To all whom it may concern:*

Be it known that I, HENRY J. CASE, a citizen of the United States, residing at Poughkeepsie, in the county of Dutchess and State of New York, have invented certain new and useful Improvements in Bundle-Carriers for Grain-Binders, of which the following is a specification, reference being had therein to the accompanying drawing.

This invention relates to bundle carrier mechanism for corn harvesters and binders, designed to receive the bound bundles from the binding mechanism and deliver the same to the ground, and the invention has reference more particularly to the type of mechanism in which the bundle carrier is in the form of a receptacle or pan movable about an axis from a receiving position at the back of the machine to a substantially longitudinal discharging position at the side of the machine. An example of this type of bundle carrier is shown in United States Letters Patent No. 1,142,399 issued to me on the 8th day of June, 1915, wherein it will be seen that the carrier or receptacle is fixed to a supporting arm mounted to swing about a forwardly and outwardly inclined axis, the inclined disposition of the axis causing the outer edge of the carrier, in the discharging operation, to swing down and permit the load to pass onto the ground.

My present invention is an improvement on the patented structure, and the invention consists mainly in so mounting the carrier on its supporting arm that while it will be swung around bodily with the arm in the movement of the latter on its axis, the carrier will be permitted to tip or move relatively to the arm, suitable means being provided for supporting the carrier in its bodily movement with the arm, and for controlling its tipping movement relative to the arm.

The invention consists also in improved means for restoring the carrier to receiving position after it has been operated to discharge its load.

Further the invention consists in so mounting the carrier or receptacle on its support that it may be swung upwardly out of the way at the side of the machine when not in use; whereby it will not offer obstruction in transporting the machine from field to field, or in passing through gates or other narrow passages, and whereby the bundles may be delivered directly in rear of the machine in the first trip of the machine in "opening up" the field.

The invention consists also in the details of construction and combination of parts hereinafter described and claimed.

In the accompanying drawings:

Figure 1 is a side elevation of the rear portion of a corn harvester and binder, showing the same provided with my improved bundle carrier, the same being shown in receiving position.

Fig. 5 is a transverse sectional elevation on the line *a—a* of Fig. 4 looking in the direction of the arrow on said line.

Fig. 6 is a sectional elevation showing how the bundle carrier is folded in inoperative position at the side of the machine for transportation of the latter.

Fig. 7 is a longitudinal sectional elevation, on an enlarged scale, of the means by which the bundle carrier is supported for swinging movement, certain parts being broken away to better illustrate the construction.

Fig. 8 is a sectional plan view of the line *a'—a'* of Fig. 7.

Fig. 9 is a perspective view of the journal bearing for the bundle carrier support, showing the supporting track for the support, and adjacent parts.

Fig. 10 is a perspective view of the bundle carrier supporting-arm detached from the bundle carrier.

Figure 2:
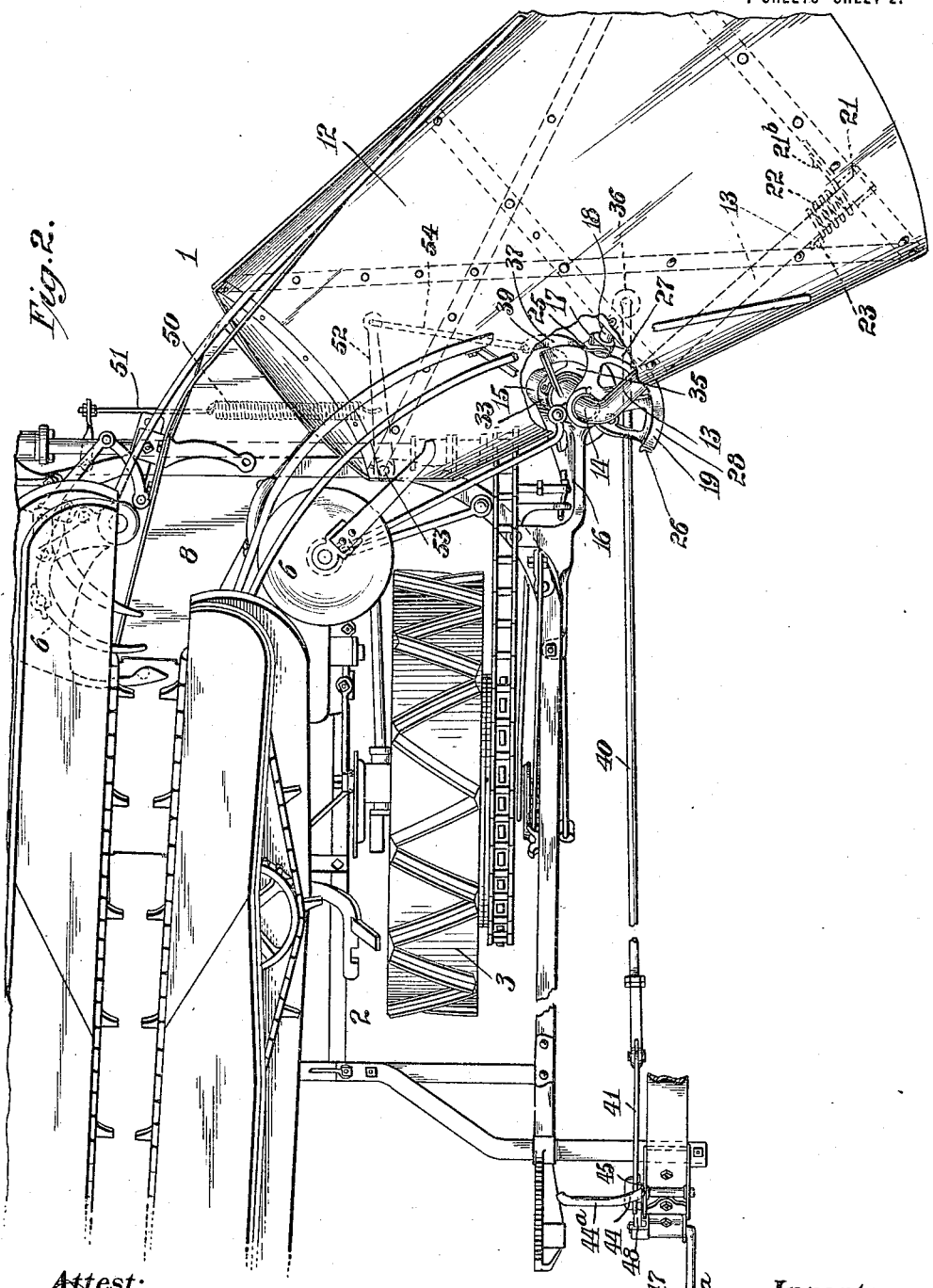
Fig. 2 is a top plan view of the same.

Fig. 10ª is a sectional elevation on the line *b—b* of Fig. 10, as viewed in the direction of the arrow.

Fig. 11 is a similar section on the line *c—c* of Fig. 10.

Fig. 12 is a perspective view, on an enlarged scale, of the foot lever mechanism for controlling the operation of the carrier, the parts being in the position they occupy when the carrier is in receiving position.

Fig. 13 is a side elevation of the same.

Fig. 14 is a top plan view of the same.

Referring to the drawings:

1 represents the rear portion of a harvesting and binding machine, the operative parts of which are mounted in the frame 2 sustained by ground wheels 3 one only of which is shown. The machine is equipped as usual with binding mechanism 6 which operates to bind the cut stalks into bundles and deliver the same, supported in upright position, on a platform or table 8, at the rear end of the machine. The foregoing parts may be of the usual construction customary in machines of this type, and except in so far as hereinafter indicated, they constitute no part of the present invention.

Figure 3:
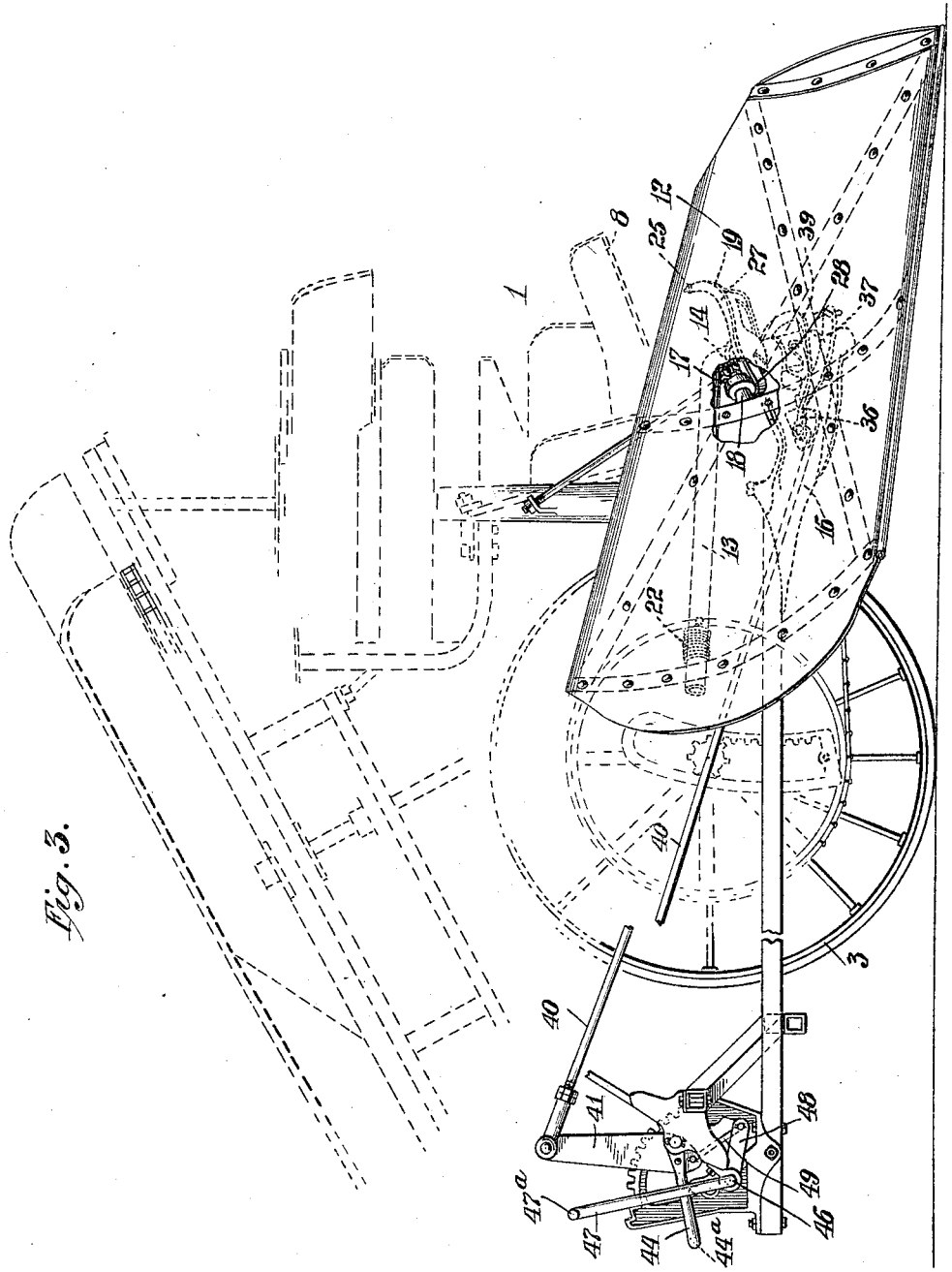
Fig. 3 is a view similar to Fig. 1 with the bundle carrier in discharging position.
Figure 4:
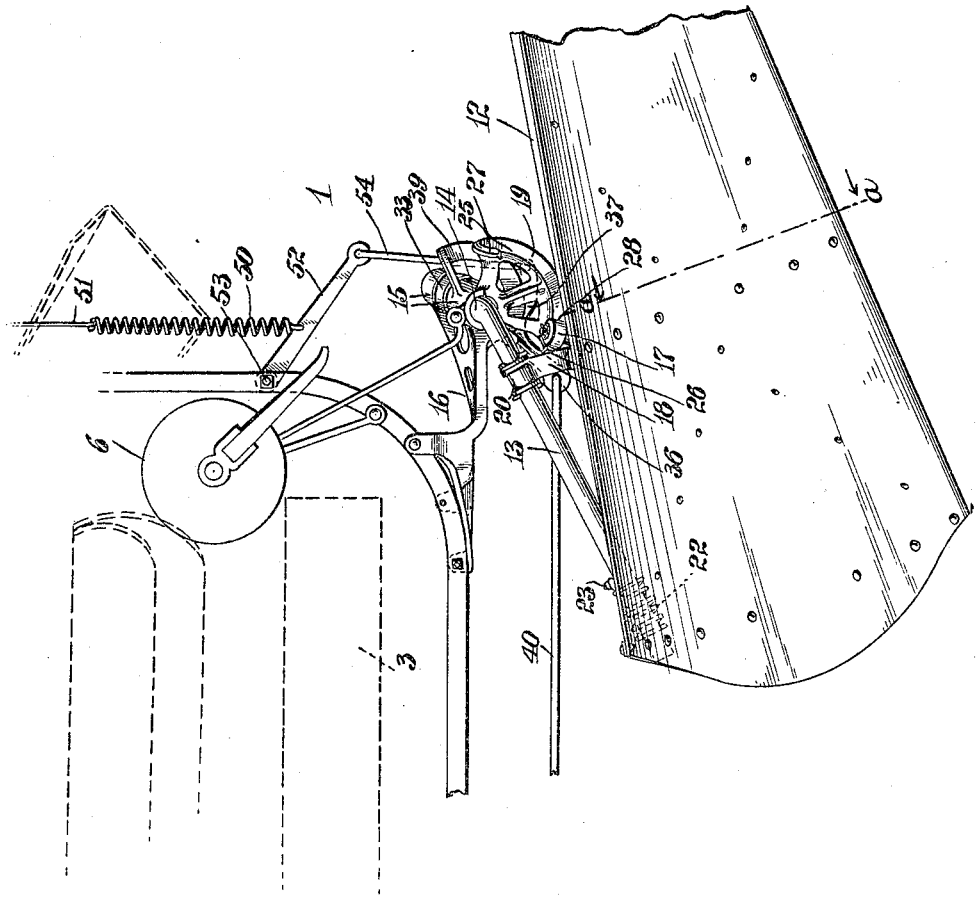
Fig. 4 is a top plan view of the same.

In carrying my invention into effect in connection with a machine of this type, I apply to the rear end of the same a bundle carrier 12 preferably in the form of a sheet metal concave pan or receptacle which is so sustained that it may occupy a substantially horizontal transverse receiving position at the rear end of the machine as shown in Fig. 2, in which position it will receive the successive bundles delivered from the platform 8, and may be swung therefrom forwardly around to the side of the machine to a substantially longitudinal, upwardly inclined position as shown in Figs. 3 and 4 to deliver the bundles at the side of the machine.

The sides of the carrier preferably diverge from the inner end outwardly in order to enable it better to receive and carry the bound bundles, and it is attached near its inner edge to an underlying supporting arm 13 which arm is provided with a downwardly extending journal 14 mounted to rock in a forwardly and outwardly inclined journal bearing 15 in a bracket 16, fixed to the frame 2 of the machine, whereby the carrier may swing about the upright inclined axis of the journal in the movement of the same from its receiving to its delivering position, and vice versa. The carrier is sustained and guided in its movements by means of a roller 17 journaled on an arm 18 on the under side of the carrier, which roller travels on a track 19 on the upper end of the bracket 16.

The carrier is connected wih the supporting arm 13 in such manner that it is capable of a tipping or rocking motion relative to the same about the axis of the arm, such connection being effected in the present instance by means of inner and outer brackets 20 and 21 respectively, which brackets are bolted to the under side of the carrier as shown more particularly in Figs. 1 and 10. The inner bracket is provided with a bearing opening 20ª and the outer bracket is provided with a bearing opening 21ª, in which bearing openings the arm 13 loosely extends. A coiled spring 22 encircles the arm at the inner side of the bracket 21 and has one end connected with the arm as at 23, and its opposite end engaged with one of a series of hooks 21ᵇ on the bracket 21, the tendency of the said spring being to counterbalance the preponderating weight of the outer portion of the carrier, for the purpose presently to be described, the engagement of the end of the spring with the different hooks serving as a means for varying the tension of the spring.

The track 19 before alluded to is provided at its rear end with an overhanging stop shoulder 25 with which the roller 17 engages when the carrier is in a transverse receiving position, as shown in Fig. 2, the engagement of these parts limiting the rearward movement of the carrier from its discharging to its receiving position, and determining the latter. The opposite forward end of the track is provided with a shoulder 26 with which the said roller engages when the carrier is in a discharging position at the side of the machine as shown in Figs. 3 and 4, the engagement of these parts limiting the forward swing of the carrier and determining its discharging position. Between these stop shoulders, the track, starting from the shoulder 25, extends in a straight line downwardly and forwardly for a portion of its length as at 27, and as the shoulder 26 is approached, it dips suddenly in a deep curve 28 constituting a socket in which the roller seats as the carrier reaches the forward limit of its swinging motion. As a result of this form of the track, the carrier in its travel from its receiving to its delivering position will be supported by the roller for the main portion of its swinging movement so that it will swing bodily around with the arm without movement relative thereto, the inclination of the axis of movement, causing the carrier to gradually descend to a lower level and to assume an upright inclined position as the end of the track is approached. As the last portion of the swinging movement of the receptacle takes place the roller will enter the dip in the track, and the carrier will be allowed to tip or swing downwardly on the axis of the arm 13 and will assume an upright downwardly inclined position as shown in Fig. 5, and the load will pass from the receptacle onto the ground by gravity. The final downward tipping movement of the carrier on the axis of the arm, applies a torsional strain to the spring 22 before alluded to, and at the moment that the load passes from the carrier to the ground, the lower edge of the same is brought very close to the surface of the ground so that the load will be delivered gently and without shock. Immediately on the passage of the load from the carrier, the spring in reacting will rock the empty receptacle slightly on the axis of the arm and will lift its lower edge so that there will be no liability of its being injured by encountering obstructions on the ground.

On reference to Fig. 7 it will be seen that the journal 14 turns in upper and lower roller bearings 29 mounted within the bearing opening in the bracket, these bearings taking the radial thrusts to which the parts are subjected, and easing the rotating movement of the journal.

The carrier is retained in receiving position, operated to deliver the bundles, and restored to receiving position for the next operation by the mechanism now to be described, and shown more particularly in Figs. 1, 2, 3, 7, 8, 9, 12, 13 and 14. In these figures it will be seen that the casting in which the journal is mounted is recessed at its rear side as at 32, so as to expose the journal at a point between the upper and lower roller bearings 29 before alluded to. Surrounding the journal at this point is a sleeve 33 which is connected with the journal by a fastening pin 34 extending through the sleeve and journal and having its ends projecting outwardly beyond the sides of the sleeve. A yoke 35 has its forked arms 35$^a$ loosely mounted on the projecting ends of the pin and is provided with a radial arm 36 and with a laterally extending arm 37. The radial arm is provided with an overhanging lip 38 which extends above and bears on a curved track 39 fixed to the casting 16 and surrounding the journal at its rear side beneath the track 19, the said track 39 extending in an arc of 180° more or less. As a result of this construction and arrangement, the radial arm will swing around with the turning movement of the journal in its bearing when the carrier is moved around from receiving to discharging position and vice versa, the pivotal connection of the yoke with the sleeve permitting the arm to move also up and down relatively to the journal.

The arm 36 has pivoted to it the rear end of a link 40 which extends forwardly at the stubble side of the frame and has jointed to its opposite end a lever 41, the said lever being fixed to a horizontal transverse shaft 43 mounted in bearings in the machine frame adjacent to and below the driver's seat. Surrounding this shaft 43 and extending alongside the lever 41 is a foot lever 44 having a foot treadle 44$^a$ which foot lever is pinned to the side of the lever 41 by means of a bolt 45 as shown more particularly in Figs. 12 and 13. As a result of this construction a forward push on the foot lever will rock the lever 41 counter-clockwise on the axis of the rock shaft 43 which action will swing the lever upwardly as in Fig. 3 and will pull forwardly on link 40, thereby swinging yoke arm 36 around from the rear. This swinging motion of the yoke arm will turn the journal 14 in its bearing and will move the carrier around from its receiving position at the rear of the machine to its discharging position at the side.

Mounted in the frame forward of the rock shaft 43 is a second horizontal transverse rock shaft 46 having fixed to its outer end a foot lever 47 provided with a foot treadle 47$^a$ and having fixed to its inner end a crank arm 48. The crank arm is connected with the lever 41 by means of a link 49 jointed at one end to the crank arm and at its other end to the end of the lever, the relation of these parts being such that when the foot lever 44 is pushed forwardly from an upright position as shown in Fig. 1, to a horizontal position as shown in Fig. 3, foot lever 47 will be swung rearwardly from an inclined position as shown in Fig. 1 to an upright position as shown in Fig. 3, this being the movement of the parts when the carrier is moved around from receiving to discharging position. When the carrier is moved back to receiving position, foot lever 44 will swing upwardly again to an upright position and foot lever 47 will swing forwardly again to its inclined position, these coördinated and relative movements of the two levers being brought about by the operative connection of the two through the medium of the crank arm 48 and link 49.

The return of the carrier from discharging to receiving position is effected automatically by means of a coiled spring 50 which serves also to hold the carrier in receiving position, the movement of the carrier to discharging position being effected by foot lever 44 in opposition to the pull of the spring and aided of course by the weight of the load in the carrier. The spring, as shown in Figs. 2 and 4, extends horizontally and transversely at the rear of the machine frame, one end being connected with a rod 51 which in turn is connected with the rear frame bar of the machine, while the other end of the spring is connected between the ends of a horizontal lever 52 pivoted at its forward end as at 53 to the machine frame. The rear end of the lever is connected with the yoke 35 by means of a link 53$^a$ jointed at one end to the lever 52 and at its opposite end to the lateral arm 37 on the yoke arm.

When now the carrier is in receiving position as shown in Fig. 2, the yoke arm will extend substantially rearwardly, with the lever 52 also extending rearwardly, and the spring will be in contracted condition, but under sufficient strain and tension to hold the carrier after it has received its load of bundles. When the carrier is moved around to discharging position, the yoke arm swinging around with the supporting journal 14, lever 52 will be moved to the inclined position of Fig. 4, thereby extending the spring so that when the load is discharged from the carrier, the empty receptacle will be returned automatically to its receiving position by the contraction of the spring.

In controlling these movements of the carrier the driver rests his right foot on the foot treadle of foot lever 44 and rests his left foot on the foot treadle of the foot lever 47, the lever 44 being in an upright position when the carrier is in receiving position and the foot lever 47 extending at an inclination forwardly and upwardly. When now the carrier has received its load of bundles and the load is to be discharged, the driver presses forwardly on foot lever 44 and swings the same down to a horizontal position as shown in Fig. 3, which action will through the medium of the connections described, swing the carrier around from the rear to the side of the machine. In this action foot lever 47 will be swung rearwardly to an upright position, the driver maintaining the pressure of his foot on lever 44 until the load has passed to the ground. He then relieves the pressure on lever 44 and allows the spring in reacting to swing the carrier back to receiving position while at the same time the movement is controlled by the foot resting on lever 44 so that the return movement will not be too sudden or violent.

By the provision of the two foot levers operatively connected to each other and to the actuating link 40 of the carrier, the driver is enabled to maintain an effective control of the carrier and can operate the same quickly and positively and without danger of sudden or violent movements in either direction, the foot lever 44 serving as a means of restraining the too sudden return of the carrier under the action of the spring, while the other foot lever serves as a means of restraining the too sudden movement of the carrier to discharging position, which in the case of an overload or unusually heavy load might otherwise occur.

In the return motion of the carrier under the influence of the spring, the roller 17 travels rearwardly and upwardly on the track 19 and finally engages beneath the overhanging lip 25 before alluded to, which lip by engaging above the roller will prevent the rise of the same from the track and thereby will prevent the upward rebound of the carrier at the moment that it comes to rest.

In order that in the transportation of the machine from field to field, or in passing through gates, the carrier may be disposed so that it will not offer an obstruction, it is adapted to be swung upwardly about the axis of the supporting arm 13 when in a discharging position at the side of the machine as shown in Fig. 6. In this position it will fold closely at the side of the ground wheel 3, it being held in its folded position by suitable means, in the present instance by means of a retaining link 54, the lower end of which is provided with a finger 54ª which may be detachably engaged with the edge of the carrier as at 55, and the upper end of which is provided with a hook 56 to be engaged with a fixed portion of the machine as at 57.

I deem the feature of the folding of the carrier at the side of the machine, as shown in Fig. 6, as of particular importance and advantage in " opening up " a field of grain, that is in the first cut of the machine therethrough. In such circumstances, there being no previously formed stubble, the bundles can not be delivered at the side of the machine as in the normal operation of the machine, but are delivered directly from the rear, the bundle carrier in such delivery being folded up at the side of the machine so as not to interfere with such rear delivery.

In the accompanying drawings and foregoing description I have disclosed my invention in the particular form and construction of the parts which I prefer to adopt and which in practice have been found to answer to a satisfactory degree the advantages and results to be attained. It is manifest, however, that the construction may be variously changed and modified without departing from the limits of my invention, and provided that the operation will be substantially as indicated above. Further, it will be understood that the invention is not limited to any particular form or construction of the parts except in so far as such limitations are specified in the claims.

Having thus described my invention, what I claim is:

1. In combination with a machine frame, a support mounted thereon and swingable about an axis, a bundle carrier pivoted to the support so as to move bodily therewith from receiving to discharging position, and so as to move also relatively to the support up and down at its outer edge to discharge the bundles, a fixed supporting track beneath the carrier, a member on the under side of the carrier at that side of its pivotal axis which moves downwardly in the discharge of the bundles, said member traveling on the track and acting to support the carrier in its bodily movement with the support, and said track being formed with a depressed portion in which said member of the carrier will enter as the carrier reaches its discharging position and will thereby permit the carrier to tip on its axis and discharge the bundles.

2. In combination with a machine frame, a supporting arm mounted thereon to swing about an axis, a bundle carrier extending substantially longitudinally of the arm and pivoted near one edge thereon to rock about an axis disposed longitudinally of the arm, whereby the opposite edge of the carrier may swing up and down, said carrier being movable bodily with the arm from receiving to discharging position, means for controlling the movement of the carrier relatively to the arm, and a spring acting respectively on the arm and carrier and tending to swing the carrier upwardly relatively to the arm.

3. In combination with a machine frame, a substantially horizontal supporting arm mounted thereon to swing about an inclined axis, a bundle carrier extending longitudinally above said arm and pivotally supported thereon to swing down relatively thereto and discharge the bundles sidewise therefrom, and a fixed inclined track beneath the carrier, which is operatively engaged by the carrier and thereby supports the same in its bodily movement with the arm, said track being so formed that when the carrier reaches its discharging position, it will be permitted to rock relatively to the supporting arm and thereby discharge the bundles.

4. In combination with a frame having a binding mechanism, a bearing on the rear of the frame on the stubble side thereof, a substantially horizontal supporting arm having a journal mounted in said bearing on an inclined axis, a bundle carrier extending substantially longitudinally of the arm and pivotally mounted thereon to swing down at its outer edge relatively to the arm to discharge the bundles, said carrier being movable bodily with the arm in the pivotal movements of the latter from a receiving position at the rear to a discharging position at the side of the same, a fixed inclined track beneath the carrier, and a roller on the under side of the carrier traveling on the upper side of the track to support the carrier in its bodily movement with the supporting arm, said track being formed with a depressed portion in which the roller is adapted to enter to control the downward swinging movement of the carrier relative to the supporting arm.

5. In combination with a machine frame, a support mounted thereon to swing about an inclined axis, a bundle carrier sustained by the support and movable bodily therewith and also relatively thereto to discharge the bundles sidewise and an inclined fixed track beneath the carrier supporting the same in its movements.

6. In combination with a machine frame, a support mounted thereon to swing about an axis inclined forwardly and laterally, a bundle carrier sustained by the support and movable bodily therewith and also relatively thereto to discharge the bundles sidewise, and a fixed track beneath the carrier inclining forwardly and downwardly and supporting the same in its movements.

7. In combination with a machine frame, a support provided with an upright journal mounted in a bearing on the frame, a bundle carrier movable with the support from receiving to discharging position and vice versa, an arm pivoted to the journal to move up and down relatively thereto for turning the journal in its bearing to control the movements of the bundle carrier, and an actuating lever mounted on the frame and operatively connected with said arm.

8. In combination with a machine frame, a support provided with a journal mounted in a bearing on the frame, a bundle carrier movable with the support from receiving to discharging position and vice versa, an arm pivoted to the journal on an axis extending transversely of the axis of the journal and movable with the journal, a relatively fixed track engaged by the arm in the movements of the latter, and an actuating lever mounted on the frame and operatively connected with the arm.

9. In combination with a machine frame, a support provided with a journal mounted in a bearing on the frame, a bundle carrier movable with the support from receiving to discharging position and vice versa, an arm movable with the journal, a lever pivoted at one end to the frame, a spring connected at one end with the frame and at its other end with said lever between the ends of the latter, a connection between said lever and the said arm, an operating lever pivoted on the frame of the machine, and operative connections between the operating lever and said arm for moving the carrier to discharging position; whereby the spring will act to return the carrier to receiving position.

10. In combination with a machine frame, a bundle carrier sustained thereby and movable relatively thereto from receiving to discharging position and vice versa, two foot levers pivoted to the frame and operatively connected together to move relatively to each other in coördination in opposite directions, and a connection from one of said foot levers to the carrier for controlling the movements of the same.

11. In combination with a machine frame, a bundle carrier sustained thereby and movable relatively thereto from receiving to discharging position and vice versa, a foot lever pivoted to the frame and operatively connected with the carrier for moving the same to discharging position, a second foot lever mounted on the frame, and a connection between said second foot lever and the first mentioned foot lever to cause the two foot levers to move relatively to each other in opposite directions in coördination to control the movements of the carrier.

12. In combination with a machine frame, a bundle carrier sustained thereby and movable relatively thereto from receiving to discharging position and vice versa, a foot lever pivoted to the frame and comprising two arms, one of which extends in a substantially horizontal position when the carrier is in receiving position, and the other of which extends upwardly on the first mentioned arm, a second foot lever mounted on the frame and comprising a rearwardly extending arm operatively connected with the horizontal arm of the first mentioned lever, and a second arm connected with the first and extending forwardly therefrom; whereby the upwardly extending arms on said levers will be caused to move in coördination with each other and in opposite directions in controlling the movements of the carrier.

13. In combination with a machine frame, a bundle carrier sustained thereby and movable relatively thereto from a receiving position at the back of the machine to a discharging position at the side thereof, an actuating arm connected with the carrier for controlling its movements, an actuating link jointed at its rear end to the arm and extending forwardly therefrom, a foot lever mounted on the frame and jointed to the forward end of the link, and a second foot lever mounted on the frame and operatively connected with the other foot lever to move in unison therewith and in a direction opposite thereto.

14. In combination with a machine frame, a support mounted thereon and swingable about an axis, a bundle carrier carried by the support and movable bodily therewith from receiving to discharging position and vice versa, and a fixed supporting track to support the carrier in its bodily movements with the support, said track being provided with an overhanging portion in position to be engaged by the carrier to prevent the carrier from rebounding at the end of its movement to receiving position.

15. In combination with a machine frame, a support movable thereon and swingable about an axis, a bundle carrier carried by the support and movable bodily therewith from receiving to discharging position and vice versa, a fixed supporting track, and a roller on the carrier adapted to travel on the track and to support the carrier in its bodily movement with the support, said track being provided at its end with an overhanging stop shoulder beneath which the roller is adapted to engage at the end of the return movement of the carrier; whereby the upward rebound of the carrier as it comes to rest will be permitted.

16. In combination with a machine frame, provided with an inclined journal bearing, a support having a journal mounted in said bearing, a bundle carrier sustained by the support and movable bodily therewith in the movement of the journal in its bearing, and said carrier movable also relatively to the support, a fixed track with which the carrier engages in its bodily movement with the support, said track adapted to control the movement of the carrier relatively to its support, an arm pivoted to the journal and movable therewith, a second fixed track with which said arm engages in its movement with the journal, an operating lever on the frame, and an operative connection between the lever and the arm.

17. In combination with a machine frame, a bundle carrier sustained thereby and movable relatively thereto from receiving to discharging position and vice versa, a spring connected with the frame and carrier for returning the same from discharging to receiving position, and two foot levers mounted on the frame and operatively connected together and to the carrier to control the movements of the latter, the said foot levers being movable in unison and relatively to each other in opposite directions.

18. In a harvester and binder, the combination of a machine frame, and a bundle carrier sustained thereby and movable from a receiving position at the back of the machine to a discharging position at the side thereof, said bundle carrier being foldable out of the way at the side of the machine to permit the bundles to be delivered to the ground at the rear of the machine, and a retaining member detachably engaged with the carrier and the machine frame to hold the former in folded position.

In testimony whereof, I have affixed my signature in presence of two witnesses.

HENRY J. CASE.

Witnesses:
Wm. J. Merkle,
H. S. Betts.

Copies of this patent may be obtained for five cents each, by addressing the "Commissioner of Patents, Washington, D. C."